United States Patent Office 2,803,556
Patented Aug. 20, 1957

2,803,556

MANUFACTURE OF BUILDING MATERIALS OF THE CONCRETE TYPE

Bengt Orvar Carlsson and Franz Ferdinand Eisner, Skovde, Sweden, assignors to Skovde Gasbetong Aktiebolag, Skovde, Sweden, a company of Sweden No Drawing. Application July 16, 1953,
Serial No. 368,504

Claims priority, application Sweden April 13, 1953

12 Claims. (Cl. 106—98)

The present invention relates to the manufacture of building materials, such as concrete and lightweight concrete, preferably in the form of building blocks, from an aqueous moulding mass containing a silicious material and a calcareous material comprising lime, inorganic hydraulic cement, e. g. Portland and aluminate types, and/or blast-furnace slag and possibly gypsum. As silicious material may be used all synthetic or natural fine-grained silicious materials, the volume weight of which can be increased by grinding, e. g. fly ashes and some diatomaceous earths.

In those cases, where the silicious material is present in a sufficiently fine-grained state without any particular treatment, as e. g. fly ashes it is usually added directly to the other ingredients. Accordingly, it may simply be mixed with lime, cement and, if desired, gypsum, and the mixture will then be transferred to a mixer containing water. However, often the solid materials are not premixed, but are separately added to the water in the mixer, and the mixing of the solid materials among themselves as well as their mixing with water occurs simultaneously. After the mixing with water, a rather viscous mass is obtained, which is poured into moulds and is allowed to set. The set mass may, if desired, be cut up in smaller pieces and hardened by steam. In the manufacture of lightweight concrete, the porosity is increased by incorporating aluminium powder or some other material which reacts with the moulding mass and evolves gas, or by beating air into the moulding mass during the mixing, building blocks of a low volume weight and a high heat insulating capacity being obtained. It has also been suggested to grind together the various constituents, even if some of the raw materials should be present in a fine-grained state before such grinding. The purpose of the grinding is then rather to bring about a more complete mixing of the raw materials than to reduce their grain size. Therefore it is usually considered satisfactory to grind to a grain size corresponding to a residue of 10–25% on a screen having an aperture size of 0.07 millimeter or a residue of 10% on a screen having an aperture size of 0.15 millimeter.

Sometimes gypsum is added to the mixture to regulate the rate of slaking of the lime, because it has proved desirable that this slaking occurs slowly and without too high a rise of temperature. This holds true particularly when lightweight concrete or gas concrete is manufactured by the addition of aluminum powder.

Building blocks manufactured according to some of said methods usually have a relatively low strength. At a volume weight of 0.7 kilogram per cubic decimeter the strength is often not quite 50 kilograms per square centimeter.

According to the present invention, a considerable increase of strength can be obtained if the silicious material, preferably fly ashes or the like, in admixture with lime and possibly with one or more of the other solid ingredients is ground until at least 95% of the ground material passes a screen having an aperture size of 0.063 millimeter.

The investigations which have led to this invention have shown, among other things, that when fly ashes are ground, their volume weight increases with the time of grinding up to a certain value, and then decreases again. It has also been proved, that the amount of water to be used to give the moulding mass the most suitable viscosity, also varies with the time of grinding, so that after a certain time of grinding a minimum percentage of water is required, and at a further increased time of grinding the water demand again increases. This is probably due to the fact, that the unground fly ashes on the one hand are devoid of the finer grain fractions, so that the "packing" of the ashes will be bad, and on the other hand to a great extent consist of spherical shells which absorb a great volume of water in themselves. If the shells are crushed, the solid material can be more closely packed and the demands of water will decrease accordingly.

It has proved, that if the fly ashes are ground to about a maximum of volume weight, or so that the amount of water required for the moulding mass will be about the least possible, the greatest strength will also be obtained. It has also been found, that it is better to grind so far, that this minimum value of the demands of water is passed, than to finish the grinding before this value is attained. This appears clearly from the following Table 1.

Table 1

| Raw powder | | Light weight concrete manufactured from the raw powder | | |
|---|---|---|---|---|
| Time of grinding in minutes | Residue on a screen of a mesh aperture of 0.063 millimeter | Demand of water in cubic centimeters per kilogram raw powder at constant viscosity | Volume weight of sample dried in air | Strength in kilograms per square centimeter |
| 0 | 26.4 | 640 | 0.70 | 40.0 |
| 5 | 14.8 | 633 | 0.71 | 40.5 |
| 10 | 9.9 | 628 | 0.70 | 41.4 |
| 20 | 7.6 | 619 | 0.72 | 48.6 |
| 30 | 4.2 | 611 | 0.69 | 58.1 |
| 40 | 3.0 | 608 | 0.70 | 66.1 |
| 50 | 1.5 | 607 | 0.69 | 80.5 |
| 60 | 0.3 | 607 | 0.71 | 88.1 |
| 70 | 0.1 | 615 | 0.70 | 86.5 |
| 80 | 0 | 620 | 0.71 | 84.3 |
| 90 | 0 | 628 | 0.70 | 81.9 |
| 100 | 0 | 635 | 0.72 | 80.2 |

The values shown in the table have been obtained with a raw powder containing calcareous material in the content of 15.0% lime, 5.7% cement and 79.3% fly ashes. Tests have shown, however, that the relations between the demands of water and the strengths will be the same if the composition of the ground material is kept within the following limits: 12–17% lime, 3–7% cement, i. e. total calcareous material in a range of 15–24% and 76–85% fly ashes.

The values of the times of grinding, given in the table, vary of course with respect to the properties of the mill used. The residues, given in the second column, also vary depending on the properties of the fly ashes. It has been found, however, on examination of about ten different fly ashes, that the smallest demands of water and the greatest strengths are obtained at about the same time, and that the residue upon a screen having a mesh aperture of 0.063 millimeter in each case has then been below 5%.

It is possible, therefore, according to the invention, with a mixture consisting of 12–17% lime, 3–7% cement and 76–85% fly ashes by grinding at least so far, that the said minimum values for the demands of water is attained, to obtain a building block with a considerably much higher strength than is the case with building blocks manufactured from mixtures containing fly ashes according to methods earlier known.

It has further been found that in case the reactive silica i. e. silica reacting with the lime during the steam hardening, is low in the fly ashes, e. g. is less than 25% of the weight thereof a portion of the fly ashes may with advantage be replaced by a substance rich in reactive silica, such as silicious sand, ground quartz, flint etc. It has been found, however, that in such case the percentage of basic constituents should be increased in order to obtain maximum strength. The additional basic material preferably consists of slaked or unslaked lime which is preferably ground together with the other ingredients. The amount of additional lime will depend on the amount and reactivity of the added substance rich in silica, but usually 5 to 10% of the weight of the latter will be appropriate.

As has been mentioned earlier, it is common to add gypsum to moulding masses for building blocks containing lime, in order to regulate the slaking of the lime. This is done particularly to such masses which give so-called light weight concrete by an addition of a gas evolving metal powder. By the influence of the gypsum, the rise in temperature will be more uniform and, thereby, a better pore structure is obtained, which means a better strength. With a mass according to the invention consisting of 12–17% lime, 3–7% cement and 76–85% fly ashes there is under certain circumstances obtained a considerably increased strength by an addition of gypsum also to such moulding masses to which a gas-evolving metal powder has not been added provided that, contrary to common practice, the gypsum is not ground together with the lime because if this is done, the following reaction will occur:

$$2CaO + CaSO_4 \cdot 2H_2O = 2Ca(OH)_2 + CaSO_4$$

Thereby, a part of the lime will slake, and at the same time the properties of the calcium sulfate will change materially. Thus, tests have shown, that among the different existing calcium sulfates the one containing 2 molecules of crystal water will render the best strength properties to the finished building block. Possibly this is due to the crystal forms of the different compounds. By this reason it is necessary to add the gypsum separately to the water, and preferably before the other solid ingredients, if the highest possible strength is to be obtained.

The importance of the water contents of the calcium sulfate appears from the following Table 2.

Table 2

| An addition to the water of 600 grams of: | Strength, kg./cm.² |
|---|---|
| CaSO₄ (anhydrit) | 496 |
| CaSO₄½H₂O | 510 |
| CaSO₄2H₂O | 644 |

In each case given above, 600 grams of the calcium sulfate in question were added to 5 liters of water, and then 10 kilograms of a mixture of 15% lime, 5.7% cement and 79.3% fly ashes, ground together, were mixed with the water.

The moulding mass obtained was cast in moulds and steam hardened. No pores were produced in the material, and thereby the influence of a variable pore structure was eliminated. Therefore, the results obtained show the great significance of the addition of gypsum for the strength of the mass itself, when it has a composition as above. If the gypsum is ground together with the lime, cement and fly ashes, a strength of only 350 kilograms per square centimeter is obtained, the composition of the moulding mass being in other respects equal to that of the other values of the table.

The influence of the amount of gypsum appears from the following Table 3. The test bodies were manufactured in the following manner. The desired amount of gypsum was added to 5 liters of water, and 10 kilograms of raw powder consisting of 15% lime, 5.7% cement and 79.3% fly ashes were then added. After moulding and setting the mass was steam hardened at a pressure of 9 atmospheres during 10 hours.

Table 3

| Grams of gypsum added to 100 grams of raw powder | Strength in kilograms per square centimeter | |
|---|---|---|
| | Fly ashes I | Fly ashes II |
| 0 | 308 | 195 |
| 1 | 420 | 360 |
| 2 | 473 | 430 |
| 3 | 492 | 519 |
| 4 | 588 | 552 |
| 5 | 596 | 535 |
| 6 | 644 | 501 |
| 7 | 530 | 482 |

It appears from the table, that considerable improvements in strength are obtained if the amount of gypsum is kept between 3 and 7%. All of the different fly ashes tested have shown a maximum of strength at 3–7%. The best values were generally obtained with 5–6% gypsum, but if the amount of sulfate in the raw powder is high, e. g. at fly ashes II in Table 3, it is sufficient to use a lower addition of gypsum, 3–4%. However, the amount of gypsum in the fly ashes can never entirely compensate the addition of gypsum. Tests with different fly ashes containing sulfate have shown, that the addition of gypsum cannot be decreased below 3% without obtaining a simultaneous decrease in strength.

Thus building blocks according to the invention are to be manufactured in the following manner if an extremely high strength is to be obtained: 12–17% lime, 3–7% cement and 76–85% fly ashes are ground together. The grinding is controlled in such a manner, that a given quantity of the ground material is mixed with a given quantity of water, and the viscosity is determined. Instead of determining a varying viscosity in controlling the grinding it is possible to adjust the proportion of water necessary for obtaining a given viscosity and determine the water used, but this method is considerably more difficult to carry out practically. It has been found, that the viscosity reaches a minimum value after a certain time of grinding. This is the correct time of grinding for obtaining the highest strength values. As an increase of the time of grinding over the correct time gives strength values which are only a little lower, whereas a shorter time of grinding gives values which are considerably lower, it is better to use a somewhat longer time of grinding than that, after which the minimum of viscosity is attained.

After the material has been properly ground it is mixed with the appropriate proportion of water, to which there has been added 3–7% gypsum, CaSo₄.2H₂O (calculated on the weight of the raw powder). The proportion of water will depend thereupon, whether porous or non-porous building blocks are to be manufactured. In the former case, a gas-evolving powder, e. g. aluminum powder, has also to be added to the mixture. After casting of the mixture in moulds it is allowed to set, after which it may be cut into smaller pieces and steam hardened.

What is claimed is:
1. In and for the manufacture of steam hardened concrete, including lightweight concrete, from an aqueous pulp containing a major portion of fly ash material and a minor portion of at least one calcareous material of the group consisting of unslaked lime, slaked lime, hydraulic cement, and blast furnace slag, the proportions of said materials being 76–85% by weight of the fly ash and 24–15% of calcareous material, the method comprising thoroughly grinding in the dry state a mixture of said fly ash material and at least the lime components of said group of calcareous material until 95–99.9% of the thus ground material passes a screen having a mesh aperture of 0.063 millimeter, and adding water to the mixture so ground.

2. In and for the manufacture of steam hardened concrete, including lightweight concrete, from an aqueous pulp containing a major portion of fly ash material, and a minor portion of at least one calcareous material of the group consisting of unslaked lime, slaked lime, hydraulic cement, and blast furnace slag, the proportions of said materials being 76–85% by weight of the fly ash and 24–15% of calcareous material, the method comprising thoroughly grinding in the dry state a mixture of said fly ash material and at least the lime components of said group of calcareous material, extracting at intervals during the grinding process samples of the ground material, determining the percentage of water required for obtaining with each sample a given viscosity within the range suitable for concrete moulding masses, continuing said grinding as long as said percentage of water required for one extracted sample decreases relative to the next preceding sample.

3. In and for the manufacture of steam hardened concrete, including lightweight concrete, from an aqueous pulp containing a major portion of fly ash material and a minor portion of at least one calcareous material of the group consisting of unslaked lime, slaked lime, hydraulic cement, and blast furnace slag, the proportions of said materials being 76–85% by weight of the fly ash and 24–15% of calcareous material, the method comprising thoroughly grinding in the dry state a mixture of said fly ash material and at least the lime components of said group of calcareous material, extracting at intervals during the grinding process samples of the ground material, determining the viscosity of the pulp obtained by mixing a given weight of each sample with a given weight of water proportioned to render a pulp of a viscosity within the range suitable for concrete moulding, continuing the grinding as long as the viscosity of one extracted sample increases relative to the next preceding sample.

4. The method as defined in claim 1 when said fly ash material is poor in reactive silica comprising adding as silicious material other than said fly ash material, a material rich in reactive silica.

5. The method as defined in claim 4 in which said material rich in reactive silica is a substance of the group consisting of silicious sand, ground quartz and flint.

6. The method as defined in claim 4 in which it is added in addition to said reactive silica a calcareous material of the group consisting of unslaked lime, slaked lime, hydraulic cement and blast furnace slag in an amount of 5 to 10 percent of weight of said added reactive silica.

7. The method as defined in claim 1 wherein said calcareous material comprises 3–7% Portland cement and the balance being lime material of the group consisting of slaked and unslaked lime.

8. The method as defined in claim 1 comprising adding gypsum containing crystal water to said water separately from said ground mixture of fly ash material and lime material.

9. The method as defined in claim 8 in which said gypsum is added to said water before said ground mixture.

10. The method as defined in claim 8 in which the amount of gypsum added is 3 to 7% of the total weight of said fly ash material and calcareous material, the percentage of gypsum being the higher the lower the percentage of sulfate of said materials.

11. The method as defined in claim 2 wherein said calcareous material comprises 3–7% Portland cement and the balance being lime material of the group consisting of slaked and unslaked lime.

12. The method as defined in claim 3 wherein said calcareous material comprises 3–7% Portland cement and the balance being lime material of the group consisting of slaked and unslaked lime.

References Cited in the file of this patent

UNITED STATES PATENTS

| | | |
|---|---|---|
| 1,785,508 | Wilner | Dec. 16, 1930 |
| 1,932,971 | Huttemann et al. | Oct. 31, 1933 |
| 2,215,891 | Thomson et al. | Sept. 24, 1940 |
| 2,564,690 | Havelin et al. | Aug. 21, 1951 |